US012605237B2

(12) United States Patent
Gregory et al.

(10) Patent No.: US 12,605,237 B2
(45) Date of Patent: Apr. 21, 2026

(54) MODEL TEETH TABLE, DENTAL MODEL, AND ARTICULATOR

(71) Applicants: NISSIN DENTAL PRODUCTS INC., Kyoto (JP); Kilgore International, Inc., Coldwater, MI (US)

(72) Inventors: Michael Gregory, Coldwater, MI (US); Koshiro Matsuo, Kameoka (JP); Teruyuki Iwasaki, Kameoka (JP); Yuhei Matsuoka, Kameoka (JP); Michiyuki Wada, Kameoka (JP); Atsushi Tashiro, Kameoka (JP)

(73) Assignees: NISSIN DENTAL PRODUCTS INC., Kyoto (JP); Kilgore International, Inc., Coldwater, MI (US)

( * ) Notice: Subject to any disclaimer, the term of this patent is extended or adjusted under 35 U.S.C. 154(b) by 107 days.

(21) Appl. No.: 17/284,888

(22) PCT Filed: Aug. 5, 2020

(86) PCT No.: PCT/JP2020/029980
§ 371 (c)(1),
(2) Date: Apr. 13, 2021

(87) PCT Pub. No.: WO2022/029922
PCT Pub. Date: Feb. 10, 2022

(65) Prior Publication Data
US 2022/0304783 A1      Sep. 29, 2022

(51) Int. Cl.
*A61C 13/34* (2006.01)
*A61C 11/00* (2006.01)

(52) U.S. Cl.
CPC .............. *A61C 13/34* (2013.01); *A61C 11/00* (2013.01)

(58) Field of Classification Search
CPC ..... A61C 11/087; A61C 11/088; A61C 11/00; A61C 13/34; G09B 23/283; G09B 23/34
See application file for complete search history.

(56) References Cited

U.S. PATENT DOCUMENTS 6,969,258 B1      11/2005      Shaygan

FOREIGN PATENT DOCUMENTS

| JP | 3103569 U | 8/2004 |
| JP | 2004-254911 A | 9/2004 |

(Continued)

OTHER PUBLICATIONS

WO2012002488A1 (Namikawa Katsuhiro; Jia Xiaochun; Iwaki Shigetsugu) (Nissin Dental Products Inc) Dental Model and Kit, Jan. 5, 2012. [retrieved on Mar. 22, 2023], Translation retrieved from: Espacenet (Year: 2012).*

(Continued)

*Primary Examiner* — Eric J Rosen
*Assistant Examiner* — Courtney N Huynh
(74) *Attorney, Agent, or Firm* — Studebaker Brackett PLLC

(57)          ABSTRACT

Provided is a dental model in which a model tooth having a root portion similar to an actual tooth is attachable to and detachable from a gum portion, and an articulator. A dental model 1 according to the present disclosure includes: a gum portion 12 in which an insertion hole 20 to which a model tooth 50 is to be inserted is provided; and a lid portion 13b provided on an oral side of the insertion hole 20 in the gum portion 12, in which the lid portion 13b constitutes a part of the gum portion 12 in a closed state, and provides a recess portion 18b that is continuous from the insertion hole 20 and exposes at least a part of a root portion of the model tooth in an opened state, and in which the lid portion 13b is (Continued)

configured to be opened and closed relative to another portion of the gum portion 12.

9 Claims, 7 Drawing Sheets

(56)                 References Cited

FOREIGN PATENT DOCUMENTS

| JP | 2007-328083 | A |   | 12/2007 |   |   |
|----|-------------|---|---|---------|---|---|
| JP | 2013-099408 | A |   | 5/2013 |   |   |
| JP | 2016-004186 | A |   | 1/2016 |   |   |
| KR | 20080004984 | U | * | 10/2008 | ........... | A61C 11/088 |
| WO | 2010/131350 | A1 |   | 11/2010 |   |   |
| WO | WO-2012002487 | A1 | * | 1/2012 | ........... | G09B 23/283 |
| WO | WO-2012002488 | A1 | * | 1/2012 | ........... | G09B 23/283 |
| WO | 2020/065847 | A1 |   | 4/2020 |   |   |

OTHER PUBLICATIONS

WO2012002487A1 (Namikawa Katsuhiro; Jia Xiaochun; Iwaki Shigetsugu) (Nissin Dental Products Inc) Dental Model, Support Base and Kit, Jan. 5, 2012. [retrieved on Mar. 22, 2023], Translation retrieved from: Espacenet (Year: 2012).*

Dental Teeth Low Jaw Bone Tissue Mandible Anatomical Jawbone Mandibular Model. Product listing [online]. bestwishesforu, May 3, 2018 [retrieved on Oct. 5, 2023]. Retrieved from the Internet: <URL: https://www.ebay.com/itm/332170928136>. (Year: 2018).*

KR20080004984U (Lin, Chao-Hung) (Song Young International Company) Tooth mold retaining frame, Oct. 29, 2008. [retrieved on Mar. 22, 2023], Translation retrieved from: Espacenet (Year: 2008).*

WO2012002488A1 (Namikawa Katsuhiro; Jia Xiaochun; Iwaki Shigetsugu) (Nissin Dental Products Inc) Dental Model and Kit, Jan. 5, 2012. [retrieved on Mar. 22, 2023], Translation retrieved from: Espacenet (Year: 2012).*

Dental Teeth Low Jaw Bone Tissue Mandible Anatomical Jawbone Mandibular Model. Product listing [online]. bestwishesforu, May 3, 2018 [retrieved on Oct. 5, 20235]. Retrieved from the Internet: <URL: https://www.ebay.com/itm/332170928136>. (Year: 2018).*

Dental Study Teeth Model Gum Removable Permanent Tooth Alternate Demonstration. Product listing [online]. imvip365, Dec. 4, 2019 [retrieved on Oct. 5, 2023]. Retrieved from the Internet: <URL:https://www.ebay.com/itm/254442775173>. (Year: 2019).*

Anonymous, "Anatomic Teaching Models—Plastic Human Dental Models-Lower Jaw with Diseased Teeth Model", 3B Scientific, Aug. 16, 2022, pp. 1-5, <https://www.3bscientific.com/us/comprehensive-lower-jaw-model-left-half-with-diseased-teeth-nerves-vessels-glands-19-part-3b-smart-anatomy-1001250-ve290-3b-scientific,p_24_2247.html>.

Communication pursuant to Article 94(3) EPC mailed by the European Patent Office on Mar. 13, 2024, which corresponds to European Patent Application No. 20948597.8-1122 and is related to U.S. Appl. No. 17/284,888.

Anonymous, "Comprehensive Lower Jaw Model (Left Half) with Diseased Teeth, Nerves, Vessels & Glands, 19 part—3B Smart Anatomy", Product listing [online], bestwishesforu, Mar. 19, 2019, pp. 32 total, <https://www.3bscientific.com/product-manual/VE290.pdf> and <https://www.3bscientific.com/us/comprehensive-lower-jaw-model-left-half-with-diseased-teeth-nerves-vessels-glands-19-part-3b-smart-anatomy-1001250-ve290-3b-scientific,p_24_2247.html>.

An Office Action mailed by the Canadian Intellectual Property Office on May 16, 2024, which corresponds to Canadian Patent Application No. 3,185,369 and is related to U.S. Appl. No. 17/284,888.

An Office Action mailed by China National Intellectual Property Administration on May 13, 2025, which corresponds to Chinese Patent Application No. 202080104524.9 and is related to U.S. Appl. No. 17/284,888; with English language translation.

* cited by examiner

FIG .2

LOWER ↕ UPPER

LOWER ↕ UPPER

EXTRA-ORAL ←→ ORAL

MODEL TEETH TABLE, DENTAL MODEL, AND ARTICULATOR

TECHNICAL FIELD

The present disclosure relates to a dental model and an articulator.

BACKGROUND ART

In dental education institutions (dental college, hygienist school, technician school), dental clinics, dental seminars, etc., a dental model is used when performing various practical exercises and examinations. Conventionally, some of such dental models have a model teeth table provided with a plurality of insertion holes to which the respective model teeth are detachably attached. The model teeth are inserted into the respective insertion holes, and the model teeth and the model teeth table are fixed by screws from the back side of the model teeth table (refer to Patent Document 1).

Patent Document 1: Japanese Unexamined Patent Application, Publication No. 2007-328083

DISCLOSURE OF THE INVENTION

Problems to be Solved by the Invention

However, for example, with regard to a molar tooth, the root portion of the natural molar tooth extends wider than the crown portion. In the conventional dental model, even in the molar tooth, the root portion is formed smaller than the insertion hole in order to allow the model tooth to be inserted into the insertion hole, and it differs in shape from the natural teeth.

There is also an assignment of extracting a nerve of a tooth in the examination to become a dentist. In such a case, a dental model for practice or examination is preferable in which the shape of the root portion where the nerve is located has a similar shape to the actual root portion and the dental model is attachable to and detachable from the gum portion.

It is an object of the present disclosure to provide a dental model and an articulator in which a model tooth having a root portion similar to an actual tooth is attachable to and detachable from a gum portion.

Means for Solving the Problems

A dental model according to an embodiment of the present disclosure includes: a gum portion in which an insertion hole to which a model tooth is to be inserted is provided; and a lid portion provided on an oral side or an extra-oral side of the insertion hole in the gum portion, in which the lid portion constitutes a part of the gum portion in a closed state, and provides a recess portion that is continuous from the insertion hole and exposes at least a part of a root portion of the model tooth in an opened state, and in which the lid portion is configured to be opened and closed relative to another portion of the gum portion.

The lid portion is preferably provided on the oral side of the gum portion.

The lid portion is preferably provided on the oral side or the extra-oral side of the insertion hole of the model tooth which is a molar tooth.

One of a protruding portion or a recess portion may be provided at an inner circumferential surface of the insertion hole, and another of the protruding portion or the recess portion which is to be engaged with the one may be provided at an outer circumferential surface of the root portion.

The lid portion may sustain the closed state by being fixed relative to the gum portion by a screw.

The dental model may be dividable into a plurality of pieces.

The dental model may be dividable into at least a first part and a second part, a recess groove may be provided on a surface of the first part facing the second part, and a protrusion that is slidable in the recess groove may be provided on a surface of the second part facing the first part.

The dental model may be dividable into at least a first part and a second part, and Furthermore, another aspect of the present disclosure provides an articulator including the above dental model and a model support portion configured to support the dental model.

Effects of the Invention

According to the present disclosure, it is possible to provide a dental model in which a model tooth having a root portion similar to an actual tooth is detachable from a gum portion, and an articulator.

BRIEF DESCRIPTION OF THE DRAWINGS

FIG. 2 is a diagram showing an upper model fixing portion 111A and an upper dental model 1A in a state being detached from the upper model fixing portion 111A;

PREFERRED MODE FOR CARRYING OUT THE INVENTION (Articulator 100)

Figure 1:
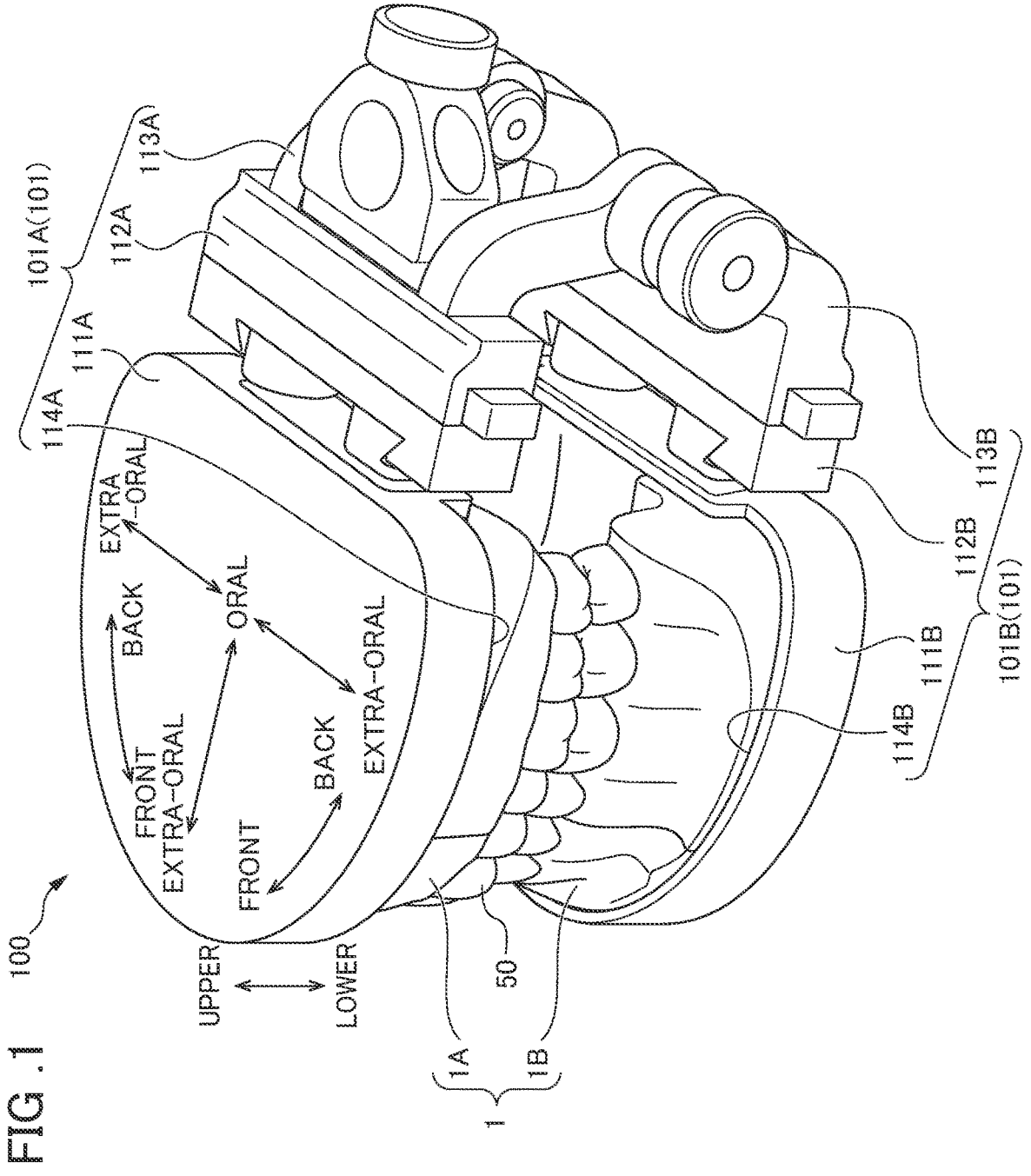
FIG. 1 is a perspective view of an articulator 100 provided with a dental model 1.

A dental model 1 of an embodiment of the present disclosure will be described with reference to the accompanying drawings. FIG. 1 is a perspective view of an articulator 100 provided with the dental model 1. The articulator 100 includes a dental model 1 and a model support portion 101. The dental model 1 includes an upper dental model 1A and a lower dental model 1B.

As illustrated below, assuming that the dental model 1 represents the interior of an actual mouth, a tongue side where the tongue is present is defined as an oral side, and the opposite cheek and lip side are defined as an extra-oral side. In addition, the molar teeth side and the front teeth side are defined as illustrated in the drawings. Also, assuming that the dental model 1 represents the interior of an actual mouth, the side of the upper teeth is defined as an upper side, and the side of the lower teeth is defined as a lower side.

(Model Support Portion 101)

The model support portion 101 includes an upper model support portion 101A that supports the upper dental model 1A and a lower model support portion 101B that supports the lower dental model 1B.

(Upper Model Support Portion 101A)

The upper model support portion 101A includes an upper model fixing portion 111A, an upper holding portion 112A holding the rear portion of the upper model fixing portion 111A, and a pair of upper rearward extending portions 113A extending obliquely rearward and downward from the upper holding portion 112A.

Figure 2:
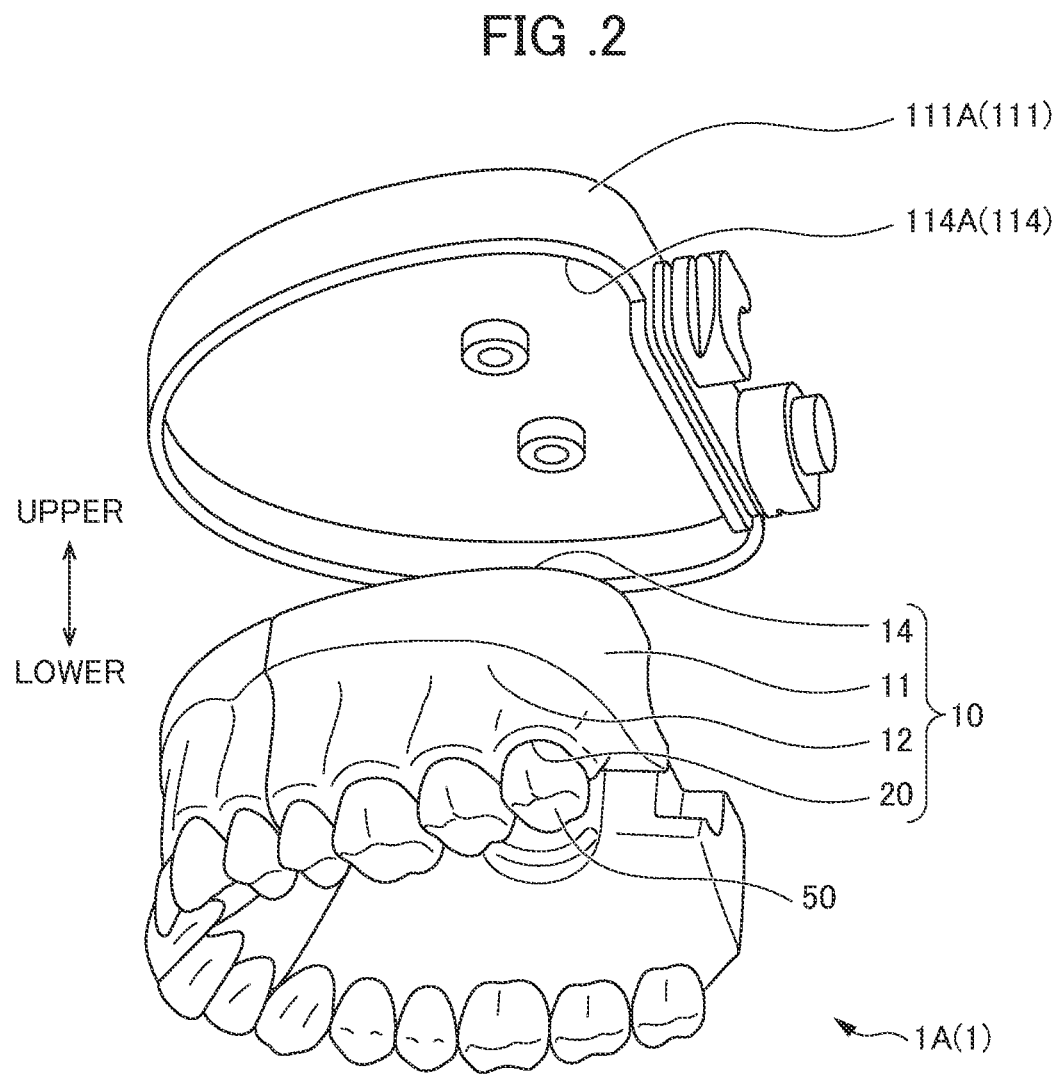

FIG. 2 is a diagram showing the upper model fixing portion 111A and the upper dental model 1A being detached from the upper model fixing portion 111A.

The upper model fixing portion 111A is composed of a magnetic material, and a storage portion 114A having a shape corresponding to the shape of the upper surface of the upper dental model 1A is provided on the lower surface. On the other hand, a magnet is embedded in the upper dental model 1A. The upper dental model 1A is fitted into the storage portion 114A of the upper model fixing portion 111A, and is detachably held by magnetic force.

With reference to FIG. 1 again, the upper holding portion 112A detachably holds the rear portion of the upper model fixing portion 111A. The pair of upper rearward extending portions 113A extends obliquely rearward and downward from one end side and the other end side in the longitudinal direction of the rear surface of the upper holding portion 112A.

(Lower Model Support Portion 101B)

The lower model support portion 101B includes a lower model fixing portion 111B, a lower holding portion 112B for detachably holding the rear portion of the lower model fixing portion 111B, and a pair of lower rearward extending portions 113B extending obliquely rearward and upward from the lower holding portion 112B.

Similar to the upper model fixing portion 111A, the lower model fixing portion 111B is composed of a magnetic material, and a storage portion 114B having a shape corresponding to the shape of the lower surface of the lower dental model 1B is provided on the upper surface. On the other hand, similarly to the upper dental model 1A, a magnet is embedded in the lower dental model 1B. The lower dental model 1B is fit into the storage portion 114B of the lower model fixing portion 111B, and detachably held by a magnetic force.

The lower holding portion 112B detachably holds the rear portion of the lower model fixing portion 111B. A pair of lower rearward extending portions 113B extends obliquely rearward and upward from one end side and the other end side in the longitudinal direction of the rear surface of the lower holding portion 112B.

The lower end of the upper rearward extending portion 113A and the upper end of the lower rearward extending portion 113B are rotatably coupled to each other.

(Dental Model 1)

Next, the dental model 1 of an embodiment of the present disclosure will be described.

The upper dental model 1A is composed of a hard synthetic resin material. The dental model 1 includes a model teeth table 10 and a plurality of model teeth 50.

The model teeth table 10 includes a pedestal portion 11 having a flat surface 14 in contact with the bottom surface of the storage portion 114 of the model support portion 101, and a gum portion 12 which is integral with the pedestal portion 11 and protrudes from the pedestal portion 11.

The model teeth 50 are inserted into the respective insertion holes 20, which are respectively provided at the top of the protruding portion of gum portion 12.

It should be noted that the above configuration is similar to that of the lower dental model 1B, and thus, the description thereof will be omitted.

Figure 3:
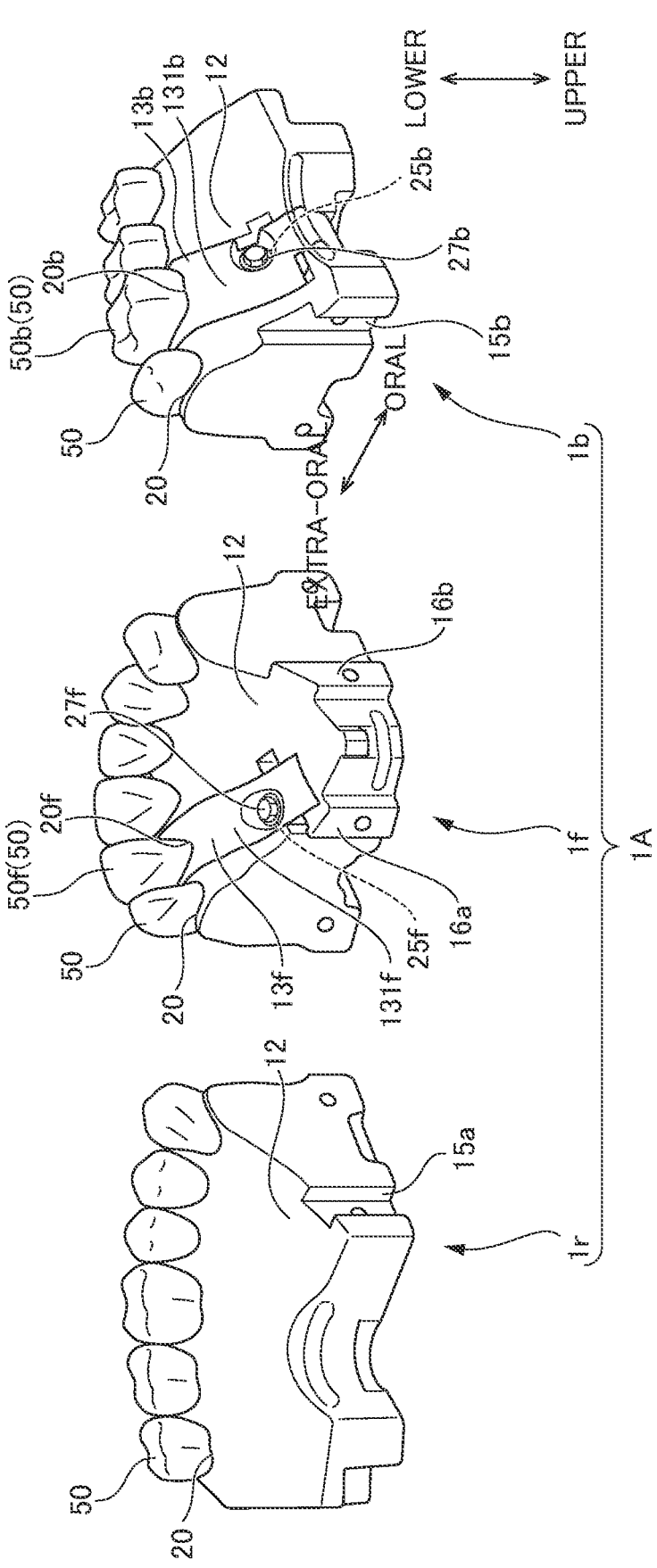
FIG. 3 shows a state in which the dental model 1 is divided.

The upper dental model 1A can be divided into a plurality of pieces. FIG. 3 shows a state in which the upper dental model 1A is divided. In the embodiment, the upper dental model 1A can be divided into three split dental models, which include a right molar teeth portion 1r (first portion), a front teeth portion 1f coupled to the right molar teeth portion 1r (second part), and a left molar teeth portion 1b coupled to the front teeth portion 1f.

A recessed groove 15a extending vertically is formed on the side surface of the right molar teeth portion 1r close to the front teeth portion 1f. A protrusion 16a which extends vertically and can be slid in the recessed groove 15a is formed on the front teeth portion 1f close to the right molar teeth portion 1r. The protrusion 16a of the front teeth portion 1f slides along the recessed groove 15a of the right molar teeth portion 1r, whereby the right molar teeth portion 1r is attached to and detached from the front teeth portion 1f. In addition, magnets are embedded respectively in the right molar teeth portion 1r and the front teeth portion 1f at positions facing each other when the right molar teeth portion 1r and the front teeth portion 1f are combined with each other. Therefore, the state of the right molar teeth portion 1r being combined with the front teeth portion 1f is held by the magnetic force.

A protrusion 16b extending vertically is formed on the front teeth portion 1f close to the left molar teeth portion 1b. A recessed groove 15b extending vertically is formed on the left molar teeth portion 1b close to the front teeth portion 1f. The protrusion 16b of the front teeth portion 1f slides along the recessed groove 15b of the left molar teeth portion 1b, whereby the left molar teeth portion 1b is attached to and detached from the front teeth portion 1f. In addition, magnets are embedded respectively in the front teeth portion 1f and the left molar teeth portion 1b at positions facing each other when the front teeth portion 1f and the left molar teeth portion 1b are combined with each other. Therefore, the state of the front teeth portion 1f being combined with the left molar teeth portion 1b is held by the magnetic force.

The plurality of insertion holes 20 are respectively provided at the top of the protruding portion of gum portion 12. The model teeth 50 are respectively inserted into the gum portions 12 through the insertion holes 20, respectively.

(Molar Teeth Lid Portion 13b)

Among the insertion holes 20, a recess portion 18b continuing from a molar insertion hole 20b is formed on the oral side of the molar insertion hole 20b to which a detachable molar model tooth 50b is attached, and a molar teeth lid portion 13b is attached to the recess portion 18b.

Figure 4:
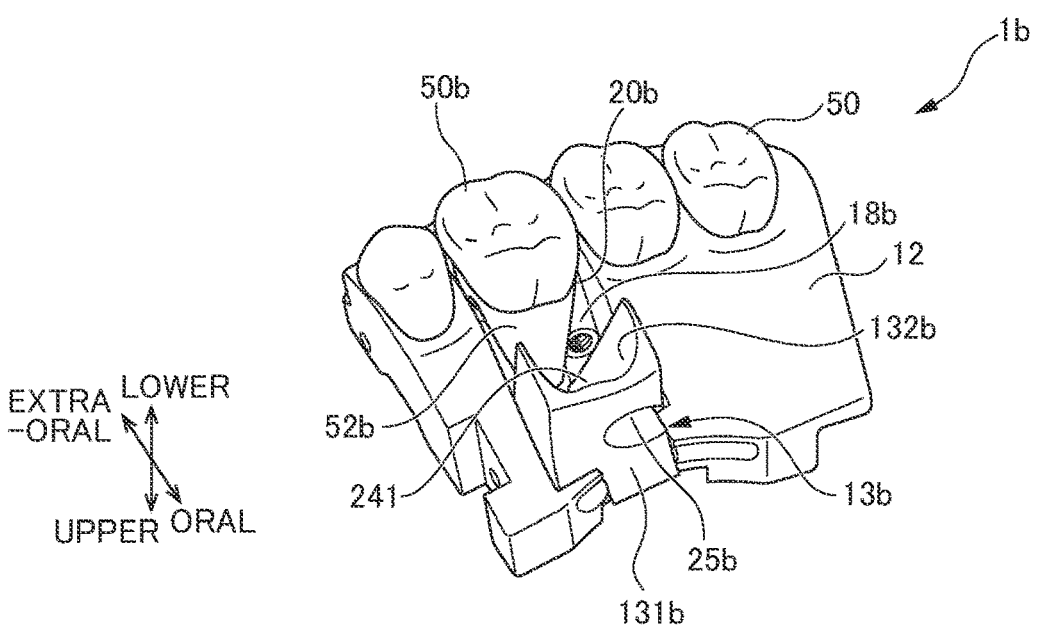
FIG. 4 is a perspective view of a left molar teeth portion 1b, and shows a state in which a molar teeth lid portion 13b is open.
Figure 5:
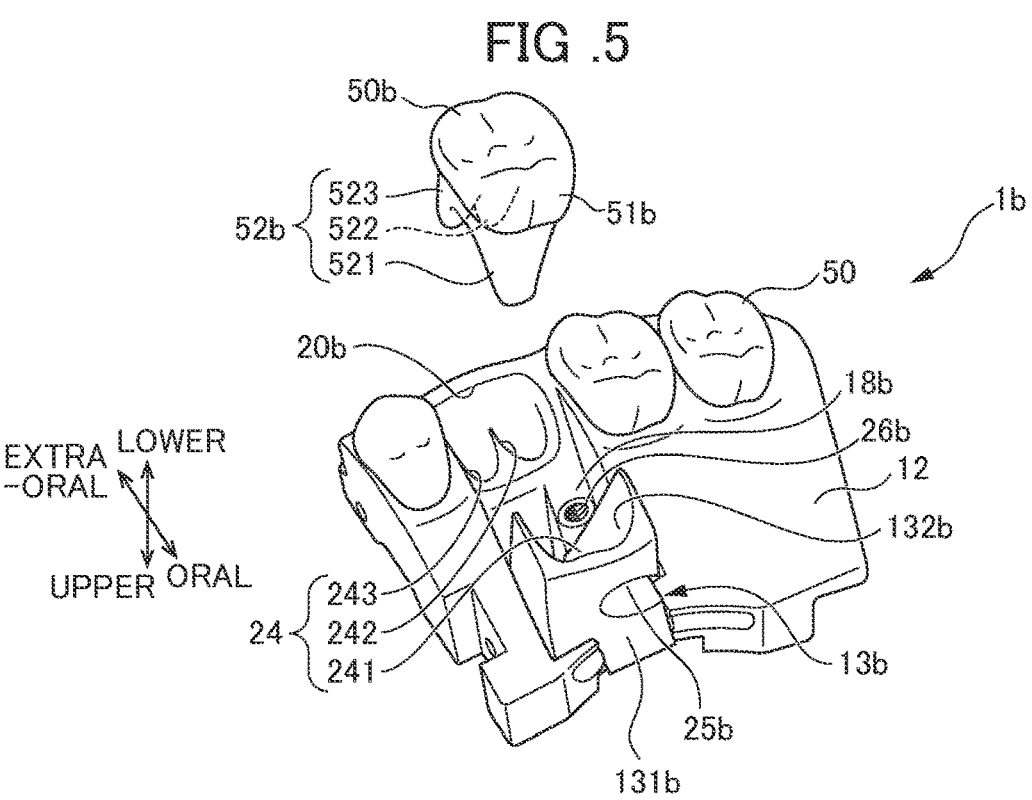
FIG. 5 is a perspective view of the left molar teeth portion 1b, and shows a state in which the molar teeth lid portion 13b is opened and a molar model tooth 50b is detached.
Figure 6:
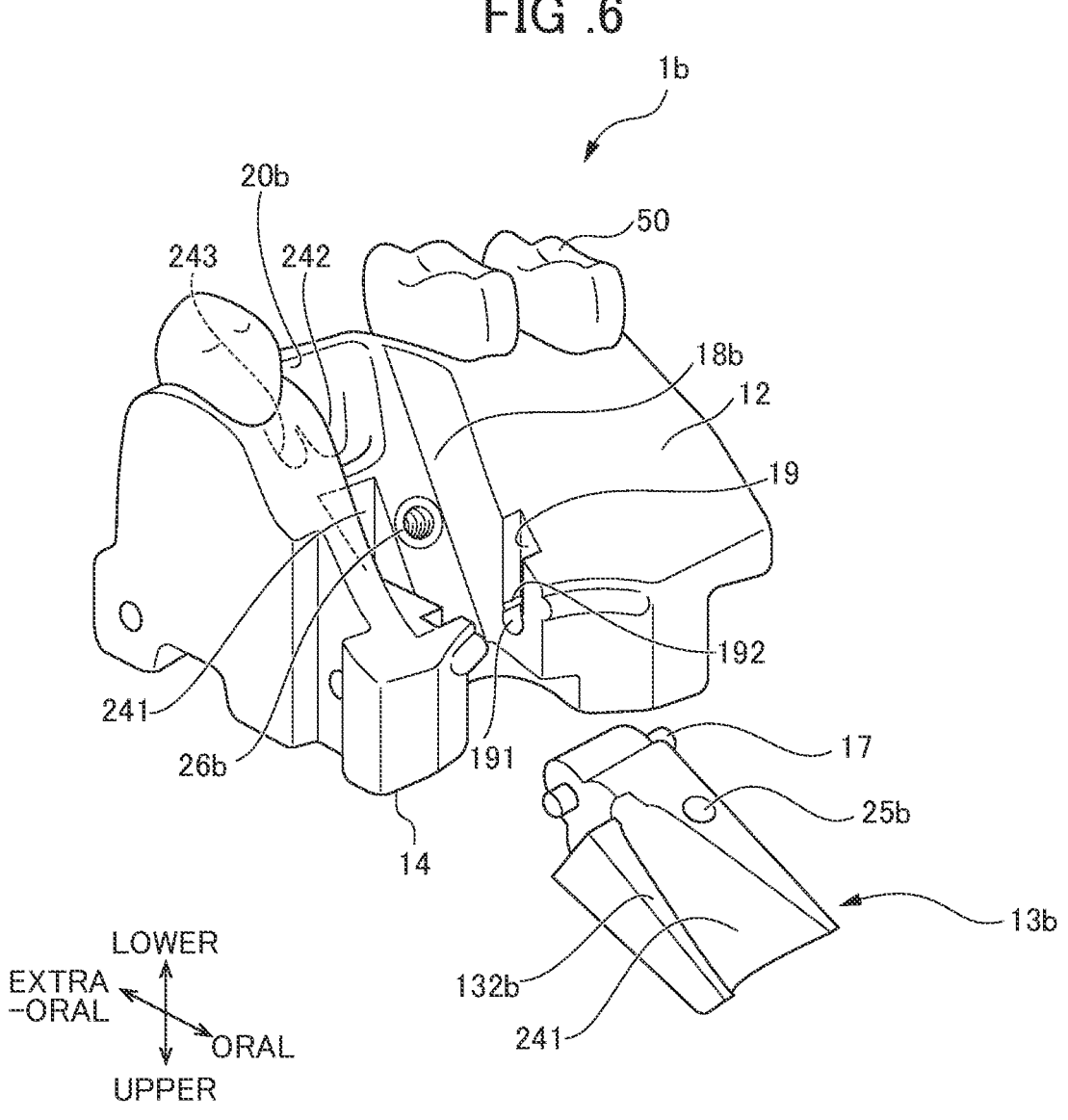
FIG. 6 is a perspective view of the left molar teeth portion 1b, and shows a state in which the molar teeth lid portion 13b is opened, and the molar model tooth 50b and the molar teeth lid portion 13b are detached.

FIG. 4 is a perspective view of the left molar teeth portion 1b, and shows a state in which the molar teeth lid portion 13b is open. FIG. 5 is a perspective view of the left molar teeth portion 1b, and shows a state in which the molar teeth lid portion 13b is opened, and the molar model tooth 50b is detached. FIG. 6 is perspective view of the left molar teeth portion 1b, and shows a state in which the molar teeth lid portion 13b is opened, and the molar model tooth 50b and the molar teeth lid portion 13b are detached.

The molar teeth lid portion 13b is composed of the same material as the gum portion 12. The molar teeth lid portion 13b constitutes a part of the gum portion 12 in a closed state, and includes a surface 131b integral with the surface of the gum portion 12, and an inner surface 132b on the opposite side thereof. Among root insertion holes 24 into which a root portion 52b (described later) is to be inserted, a portion of the inner circumferential surface which forms a root insertion hole 241 is formed on the inner surface 132b.

The surface 131b of the molar teeth lid portion 13b in the closed state shown in FIG. 3 constitutes a part of the gum portion 12, the shape of the gum portion in an actual mouth is simulated, and the upper rim portion of the molar teeth lid portion 13b constitutes a part of the rim of the opening of the molar insertion hole 20b.

As shown in FIG. 6, on both sides of the base end portion of the molar teeth lid portion 13b, shaft portions 17 extending in the dentition direction are formed to protrude, respectively. On the other hand, in the inner surface of the recess portion 18b of gum portion 12, there is a groove portion 19 into which the shaft portion 17 is to be inserted.

The groove portion 19 extends vertically from a tooth tip side of the model teeth 50 toward the flat surface 14, but does not penetrate the flat surface 14, and a bottom portion 191 is provided. Furthermore, a projection 192 is provided below the bottom portion 191 of the inner surface of the groove portion 19 (on the tooth tip side which is an upper side in FIG. 6).

The shaft portion 17 is inserted into the groove portion 19 from the tooth tip side and slid to the flat surface 14 side. When the shaft portion 17 passes over the projection 192, the shaft portion 17 is held in the space between the projection 192 and the bottom portion 191 in the groove portion 19. Once the shaft portion 17 is held in its space, the shaft portion 17 is rotatably held in the space unless a force is applied to pass over the projection 192. The rotation of the shaft portion 17 in its space makes it possible for the molar teeth lid portion 13b to be swingable between the closed state of FIG. 3 and the open state of FIGS. 4 and 5 around the shaft portion 17.

Furthermore, a screw insertion hole 25b of the transverse orientation which penetrates from the surface 131b side to the inner surface 132b side is provided in the molar teeth lid portion 13b. On the other hand, a threaded hole 26b is provided in a transverse orientation in the inner face facing the oral side at the recess portion 18b of gum portion 12.

(Molar Model Tooth 50b)

As shown in FIG. 5, the molar model tooth 50b includes a crown portion 51b and the root portion 52b.

The crown portion 51b is a portion exposed from the molar insertion hole 20b in the gum portion 12 with the molar model tooth 50b fixed to the gum portion 12.

The root portion 52b is a portion which is inserted into the interior of the molar insertion hole 20b and is covered by the gum portion 12 including the lid portion 13b with the molar model tooth 50b being fixed to the gum portion 12.

The root portion 52b of the molar model tooth 50b comprises three root portions including a root portion 521 on the oral side, and a root portion 522 and a root portion 523 on the extra-oral side, and the root portion 521 on the oral side extends more laterally than the crown portion 51b. Extending laterally refers to a state in which the root portion 52b protrudes outward from the crown portion 51b when the model teeth 50 are viewed from the crown portion 51b side.

In the interior of the molar insertion hole 20b, which is provided in the gum portion 12, a root insertion hole 242 and a root insertion hole 243 are provided, into which the root portion 522 and the root portion 523 on the extra-oral side are to be inserted.

Furthermore, a part of the inner circumferential surface is provided which forms the root insertion hole 241 to which the root portion 521 on the oral side is to be inserted. When the molar teeth lid portion 13b is closed, the part of the inner circumferential surface which forms the root insertion hole 241 provided in the molar teeth lid portion 13b and the part of the inner circumferential surface which forms the root insertion hole 241 provided in the recess portion 18b together constitute the root insertion hole 241.

Furthermore, an upper edge portion of the molar insertion hole 20b and an upper edge portion of the molar teeth lid portion 13b together define an edge portion of an opening of the molar insertion hole 20b.

Here, the opening of the molar insertion hole 20b of the embodiments is similar to that in an actual mouth, and is approximately the same shape as the outer circumference of the border between the crown portion 51b and the root portion 52b, which is the root of the crown portion 51b. Therefore, when the molar teeth lid portion 13b is being closed, the molar model tooth 50b having the root portion 521, which protrudes more outward than the crown portion 51b, cannot be attached to and detached from the gum portion 12 through the molar insertion hole 20b.

However, in the embodiment, the molar teeth lid portion 13b is opened as shown in FIG. 5 to open the recess portion 18b which is continuous from the molar insertion hole 20b.

Thereafter, the root portion 522 and the root portion 523 of the molar model tooth 50b are inserted into the root insertion hole 242 and the root insertion hole 243, respectively, which are provided in the interior of the molar insertion hole 20b. One of the outer circumferential surface of the root portion 521 abuts the inner circumferential surface constituting a part of the root insertion hole 241 provided in the recess portion 18b. This leads to the state shown in FIG. 4.

When the molar model tooth 50b is closed from the state shown in FIG. 4, the other side of the outer circumferential surface of the root portion 52b of the molar model tooth 50b abuts the inner surface constituting the other portion of the root insertion hole 241 which is provided on the inner surface 132b of the molar teeth lid portion 13b.

With the molar teeth lid portion 13b closed, a screw 27b is inserted in the transverse orientation into the screw insertion hole 25b, and screwed into the threaded hole 26b of the gum portion 12. This allows the root portion 521 of the molar model tooth 50b to be held by the molar teeth lid portion 13b, a result of which the molar model tooth 50b is fixed to the gum portion 12.

When detaching the molar model tooth 50b from the gum portion 12, the screw 27b is rotated reversely contrary to when attaching the molar model tooth 50b as described above, and the molar model tooth 50b is detached from the threaded hole 26b and the screw insertion hole 25b. Furthermore, when the molar teeth lid portion 13b is opened, it is possible to detach from the gum portion 12 the molar model tooth 50b having the root portion 521, which protrudes more outward than the crown portion 51b.

(Front Teeth Lid Portion 13f)

In the embodiment, a recess portion 18f is also formed on the oral side of a front insertion hole 20f to which a detachable front model tooth 50*f* among the insertion holes 20 in the gum portion 12 is attached, and a front teeth lid portion 13*f* is attached to the recess portion 18*f*.

Figure 7:
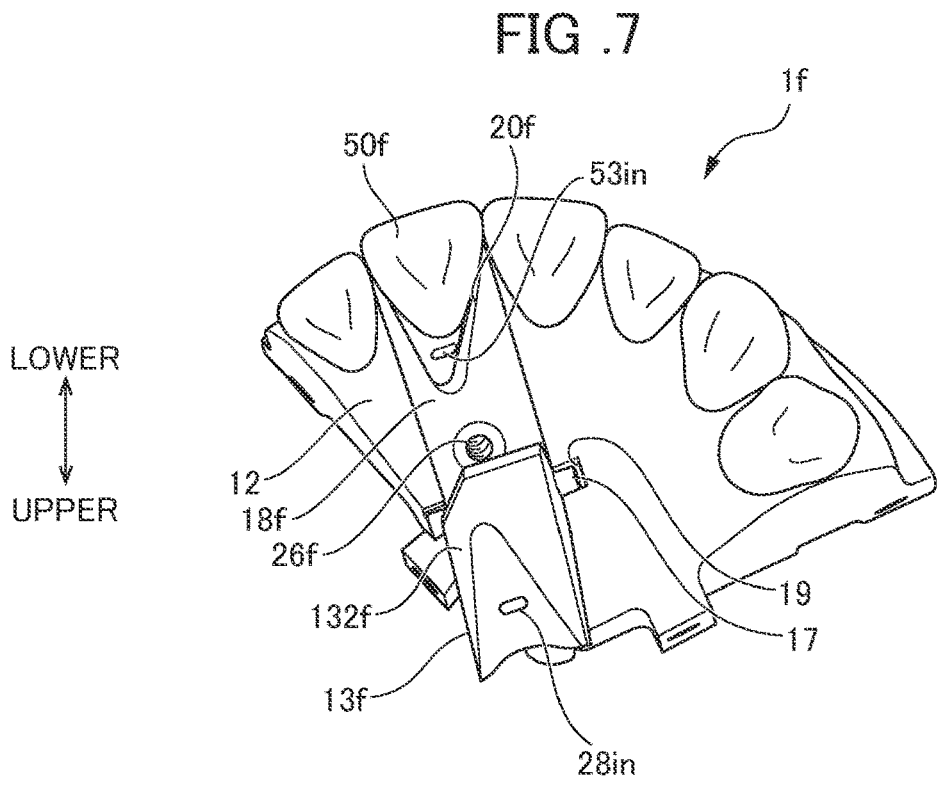
FIG. 7 is a top view of a front teeth portion 1f, and shows a state in which a front teeth lid portion 13f is open.
Figure 8:
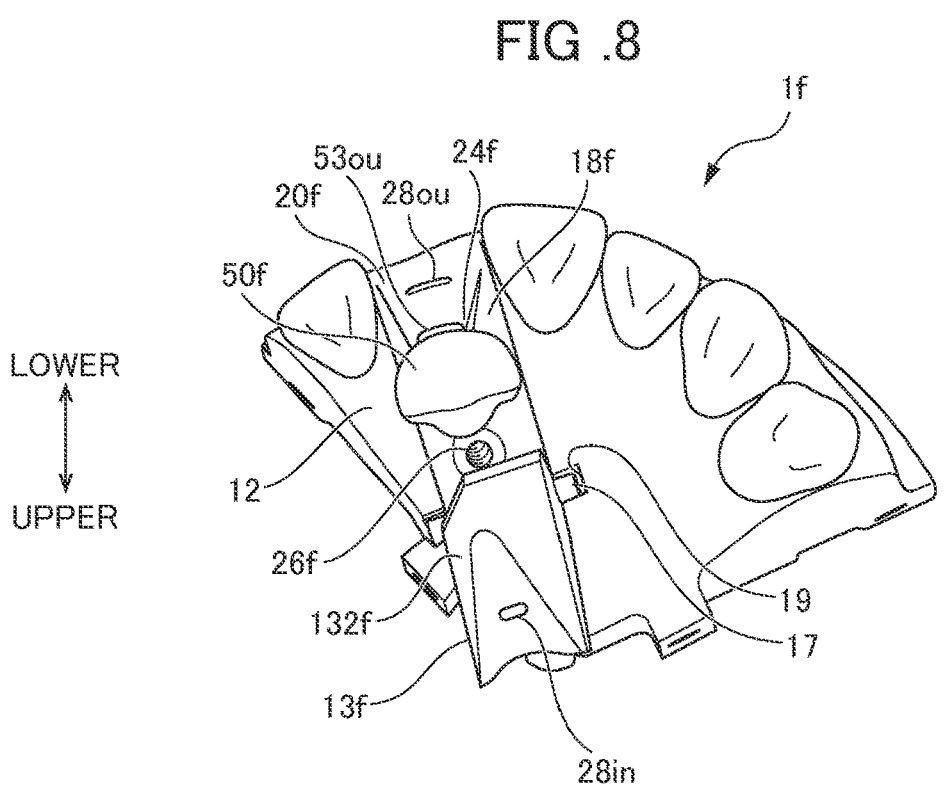
FIG. 8 is a top view of the front teeth portion 1f, and shows a state in which the front teeth lid portion 13f is opened and a front model tooth 50f is moved inside.
Figure 9:
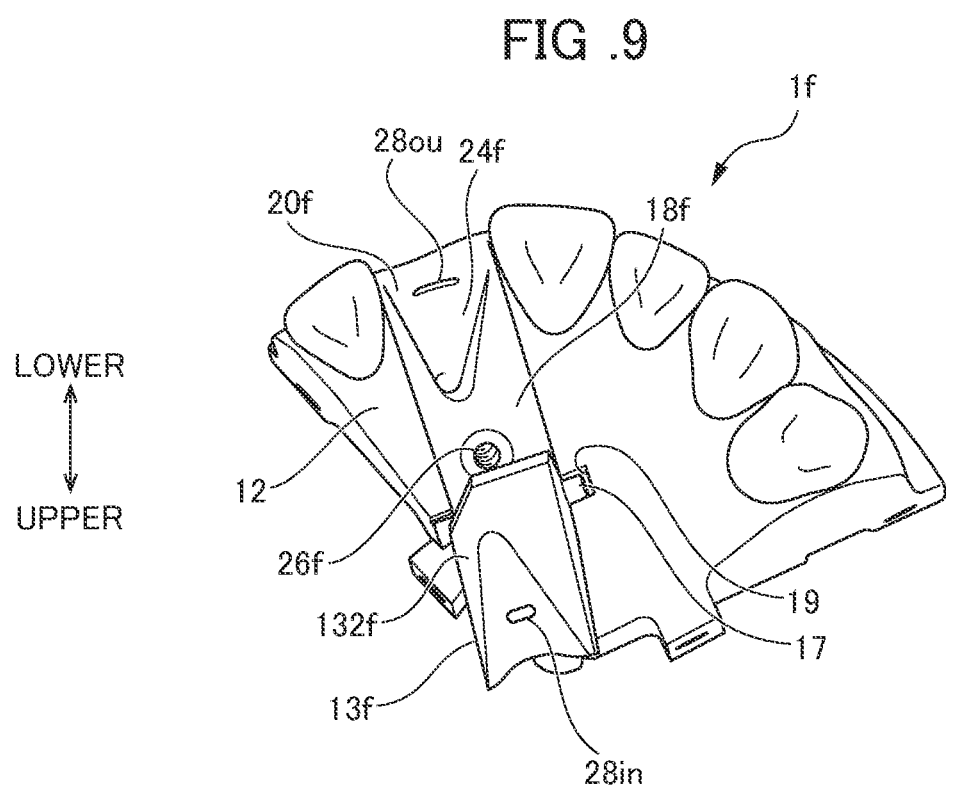
FIG. 9 is a top view of the front teeth portion 1f, and shows a state in which the front teeth lid portion 13f is opened and the front model tooth 50f is detached.
Figure 10:
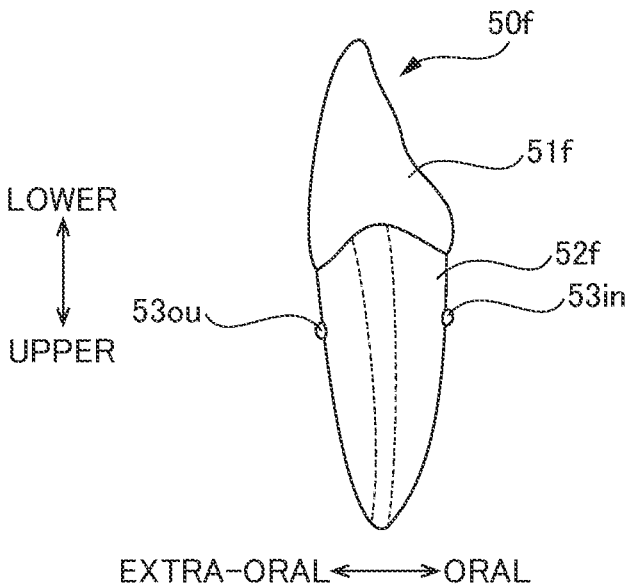
FIG. 10 is a lateral view of the front model tooth 50f.

FIG. 7 is a top view of the front teeth portion 1*f*, and shows a state in which the front teeth lid portion 13*f* is open. FIG. 8 is a top view of the front teeth portion 1*f*, and shows a state in which the front teeth lid portion 13*f* is opened and the front model tooth 50*f* is moved inside. FIG. 9 is a top view of the front teeth portion 1*f*, and shows a state in which the front teeth lid portion 13*f* opened and the front model tooth 50*f* is detached. FIG. 10 is a lateral view of the front model tooth 50*f*.

The front teeth lid portion 13*f* is composed of the same material as the gum portion 12. The front teeth lid portion 13*f* constitutes a part of the gum portion 12 in a closed state, and includes a surface 131*f* integrated with the surface of the gum portion 12, and an inner surface 132*f* on the opposite side thereof. A portion of the inner circumferential surface which forms a root insertion hole 242 into which a root portion 52*f* (described later) is to be inserted is formed on the inner surface 132*f*.

The surface 131*f* of the front teeth lid portion 13*f* in the closed state shown in FIG. 3 constitutes a part of the gum portion 12, the shape of the gum portion in an actual mouth is simulated, and the upper end portion of the front teeth lid portion 13*f* constitutes a part of the rim of the opening of the front insertion hole 20*f*.

Since the attachment structure of the front teeth lid portion 13*f* to the gum portion 12 is similar to that of the molar teeth lid portion 13*b* to the gum portion 12, an explanation thereof will be omitted.

A screw insertion hole 25*f* which penetrates in the vertical direction is provided in the front teeth lid portion 13*f*. On the other hand, a threaded hole 26*f* which extends in the vertical direction is provided on the inner surface of the recess portion 18*f* of the gum portion 12.

In addition, a depression 28*in* is provided in the inner surface of the front teeth lid portion 13*f* facing the oral side with the front teeth lid portion 13*f* closed.

(Front Model Tooth 50*f*)

As shown in FIG. 10, the front model tooth 50*f* includes a crown portion 51*f* and a root portion 52*f*. Unlike the molar model tooth 50*b*, the root portion 52*f* of the front model tooth 50*f* does not protrude more outward than the crown portion 51*f*. Furthermore, a projecting portion 53*in* and a projecting portion 53*ou* are respectively provided on the oral side and the extra-oral side on the outer circumferential surface of the root portion 521.

(Recess Portion 18*f*)

A root insertion hole 24*f* into which a root portion 52*f* is inserted is provided in the interior of the recess portion 18*f* provided in the gum portion 12. A depression 28*ou* is provided at a portion facing the oral side of the inner circumferential surface of the root insertion hole 24*f*.

Furthermore, the oral side of the root insertion hole 24*f* does not cover a part of the root portion 52*f* on the crown portion 51*f* side. Therefore, when the front teeth lid portion 13*f* is opened with the root portion 52*f* inserted into the root insertion hole 24*f*, a portion of the root portion 52*f* on the crown portion 51*f* side is exposed. When the front teeth lid portion 13*f* is closed, the inner surface of the front teeth lid portion 13*f* covers a portion thereof.

Thereafter, the edge portion of the root insertion hole 24*f* and the edge portion of the front teeth lid portion 13*f* define the opening of the front insertion hole 20*f*.

The front model tooth 50*f* is inserted into the opened root insertion hole 24*f* with the front teeth lid portion 13*f* opened, as shown in FIG. 9.

At this time, as shown in FIG. 8, the front model tooth 50*f* is inserted with the tooth tip tilted inward to the oral side, and after the front model tooth 50*f* is inserted deeply, the front model tooth 50*f* is pressed toward the extra-oral side.

Thereafter, a projecting portion 53*ou* provided on the extra-oral side of the outer circumferential surface of the root portion 52*f* is fit into the depression 28*ou* provided in the portion facing the oral side of the inner circumferential surface of the root insertion hole 24*f* of the gum portion 12. This leads to the state shown in FIG. 7.

The front model tooth 50*f* is closed from the state shown in FIG. 7. Thereafter, the projecting portion 53*in* provided on the oral side of the outer circumferential surface of the root portion 52*f* is fit into the depression 28*in* provided in the inner surface facing the extra-oral side of the front teeth lid portion 13*f*.

Then, the screw 27*f* is screwed into the threaded hole 26*f* in the gum portion 12 by inserting the screw 27*f* vertically into the screw insertion hole 25*f* with the front teeth lid portion 13*f* closed. With such a configuration, the front teeth lid portion 13*f* is fixed to the gum portion 12.

Here, the opening of the front insertion hole 20*f* of the embodiment is similar to that in an actual mouth, and is approximately the same shape as the outer circumference of the border between the crown portion 51*f* and the root portion 52*f*, which is the root of the crown portion 51*f*.

Therefore, in the absence of any countermeasures, the front model tooth 50*f* having the root portion 52*f* which is narrower than the crown portion 51*f* can be detached from the insertion hole 20 even when the front teeth lid portion 13*f* is closed.

However, in the embodiment, the fitting of the protruding portion 53*ou* provided at the root portion 52*f* and the depression 28*ou* provided in the inner circumferential surface of the root insertion hole 24*f*, and the fitting of the protruding portion 53*in* provided at the root portion 52*f* and the depression 28*in* provided at the front teeth lid portion 13*f* make it possible to prevent the front model tooth 50*f* from detaching from the insertion hole 20.

When detaching the front model tooth 50*f*, the screw 27*f* is rotated in reverse to when attaching the front model tooth 50*f* as described above, and the front model tooth 50*f* is detached from the threaded hole 26 and the screw insertion hole 25. Then, the front teeth lid portion 13*f* is opened. With such a configuration, the depression 28*in* provided in the inner surface facing the extra-oral side of the front teeth lid portion 13*f* is detached from the protruding portion 53*in* provided on the oral side of the outer circumferential surface of the root portion 52*f*.

Then, the front model tooth 50*f* is pressed toward the oral side. With such a configuration, the protruding portion 53*ou* provided on the extra-oral side of the outer circumferential surface of the root portion 521 is detached from the depression 28*ou* provided at the portion facing the oral side of the inner circumferential surface of the root insertion hole 241 of the gum portion 12.

This makes it possible to detach the front model tooth 50*f* from the root insertion hole 241.

As described above, according to the present embodiment, the following effects are achieved.

According to the dental model 1 of the embodiment, even in a case of the model tooth 50 having the root portion 52*b* which protrudes more outward than the crown portion 51*b*, which is similar to an actual tooth, it is possible to attach and detach the model tooth 50*b* to and from the gum portion 12 by opening the lid portion 13*b* provided in the gum portion 12 and exposing at least a part of the root portion 52*b*.

At this time, the opening of the insertion hole 20*b* is substantially in the same shape as the outer circumference of the boundary between the crown portion 51*b* and the root portion 52*b* while the lid portion 13*b* is closed. Therefore, there is no gap around the boundary.

Furthermore, since at least a part of the root portion 52*b* is exposed by opening the lid portion 13*b*, it is possible to observe the root portion 52*b* while the root portion 52*b* is attached to the gum portion 12.

Since the model tooth 50 has a shape similar to that of the natural tooth, for example, it is possible perform practice of extracting a nerve using the model tooth 50.

Since the lid portion 13*g*, 13*f* constitutes a part of the gum portion 12 in a closed state, the actual gum shape is not impaired.

Since the dental model can be divided, it is possible to submit only the necessary part in the examination of dental education, and the scoring side can easily perform the observation, and less space can be provided for the storage.

Modification Example

In the above embodiment, the molar teeth lid portion 13*b* is provided on the oral side of one molar model tooth 50*b* among the model teeth 50 included in the left molar teeth portion 1*b*, and the molar model tooth 50*b* is attachable to and detachable from the gum portion 12. Then, the front teeth lid portion 13*f* is provided on the oral side of the one front model tooth 50*f* among the model teeth 50 included in the front teeth portion 1*f*, and the front model tooth 50*f* is attachable to and detachable from the gum portion 12.

However, the present disclosure is not limited thereto, and other teeth can be the attachable/detachable model teeth 50 in which the lid portion is provided. Furthermore, the number of the attachable/detachable model teeth 50 is not limited to two, and may be more than two or less than two. Moreover, all of the model teeth are attachable or detachable.

In the embodiments, an example in which the lid portion 13 is provided in the upper dental model 1A is provided. However, the present disclosure is not limited thereto, and a lid portion may be provided in the lower dental model 1B.

The lid portion 13 is configured to swing by the shaft portion 17 relative to the gum portion 12. However, the present disclosure is not limited thereto, and the lid portion 13 may not be engaged by the shaft portion 17, and may be, for example, separated upon detachment.

In the embodiment, the lid portion 13 is provided on the oral side of the insertion hole 20. According to this, the lid portion 13 is not visible when viewed from the extra-oral side. Therefore, it is superior in appearance. However, the present invention is not limited thereto, and the lid portion 13 may be provided on the extra-oral side of the insertion hole 20.

In the embodiments, the upper dental model 1A may be divided into three pieces. However, the present disclosure is not limited thereto. The number of divided pieces is not limited to three. Furthermore, the locations for the division are not limited to those in the embodiments. Furthermore, the lower dental model 1B may be divided.

EXPLANATION OF REFERENCE NUMERALS

1 dental model
1A upper dental model

1B lower dental model
12 gum portion
13*b*,13*f* lid portion
14 flat surface
15*a*, 15*b* recessed groove
16*a* protrusion
16*b* protrusion
17 shaft portion
18*b* recess portion
18*f* recess portion
19 groove portion
20 insertion hole
24 root insertion hole
25 screw insertion hole
26 threaded hole
27 screw
28*in*,28*ou* depression
50 model tooth
51*b*,51*f* crown portion
52*b*,52*f* root portion
53*in*,53*ou* protruding portion
100 articulator
101 model support portion
131*b*,131*f* surface
132*b*,132*f* inner surface
191 bottom portion
192 projection

The invention claimed is:

1. A dental model comprising:
a plurality of model teeth and
a model teeth table comprising:
a gum portion comprising a plurality of insertion holes, wherein a model tooth of the plurality of model teeth is inserted into the gum portion through an insertion hole of the plurality of insertion holes, and a plurality of recess portions, wherein a recess portion of the plurality of recess portions is continuous from the insertion hole on an oral side of the insertion hole, wherein the recess portion includes two groove portions in opposing inner surfaces thereof; and
a lid portion provided on an oral side of the insertion hole in the gum portion, the lid portion being configured to open and close relative to the recess portion, wherein the lid portion has a base end portion and an end portion opposite the base end portion, both sides of the base end portion of the lid portion each including a shaft portion that protrudes from the lid portion, each shaft portion on either side of the lid portion is held within one of the two groove portions;
wherein when the shaft portion is held in the groove portion and the shaft portion rotates in the groove portion, the lid portion is configured to swing around the shaft portion between a closed state and an open state relative to the recess portion,
wherein a rim portion of the end portion opposite the base end portion of the lid portion in the closed state relative to the recess portion constitutes a part of a rim of an opening of the insertion hole,
wherein the lid portion constitutes a part of the gum portion when the lid portion is in the closed state relative to the recess portion, and
wherein at least a part of a root portion of the model tooth inserted in the insertion hole is exposed when the lid portion is in the open state relative to the recess portion.

2. The dental model according to claim 1, wherein the model tooth is a front tooth.

3. The dental model according to claim 1, wherein the model tooth is a molar tooth.

4. The dental model according to claim 1, wherein the lid portion sustains the closed state by being fixed relative to the gum portion by a screw.

5. The dental model according to claim 1, wherein the model teeth table is dividable into a plurality of pieces, at least one piece of the plurality of pieces including one model tooth of the plurality of model teeth, one gum portion of a plurality of gum portions, and one lid portion of a plurality of lid portions.

6. The dental model according to claim 5, wherein the plurality of pieces comprises a first piece and a second piece, a recess groove is provided on a surface of the first piece facing the second piece, and a protrusion that is slidable in the recess groove is provided on a surface of the second piece facing the first piece.

7. The dental model according to claim 5, wherein the plurality of pieces comprises a first piece and a second piece, and wherein the second piece is held by magnetic force to the first piece.

8. An articulator comprising:

a dental model according to claim 1; and a model support portion configured to support the dental model.

9. The dental model according to claim 1, wherein one of a protruding portion or a depression is provided at an inner circumferential surface of the insertion hole, and another of the protruding portion or the depression which is to be engaged with the one is provided at an outer circumferential surface of the root portion.

\* \* \* \* \*